May 19, 1953  
F. MANTELL  
2,639,060  
DISPENSING APPARATUS FOR MEASURING AND DELIVERING A PLURALITY OF LIQUIDS  
Filed April 17, 1951  
2 Sheets-Sheet 2
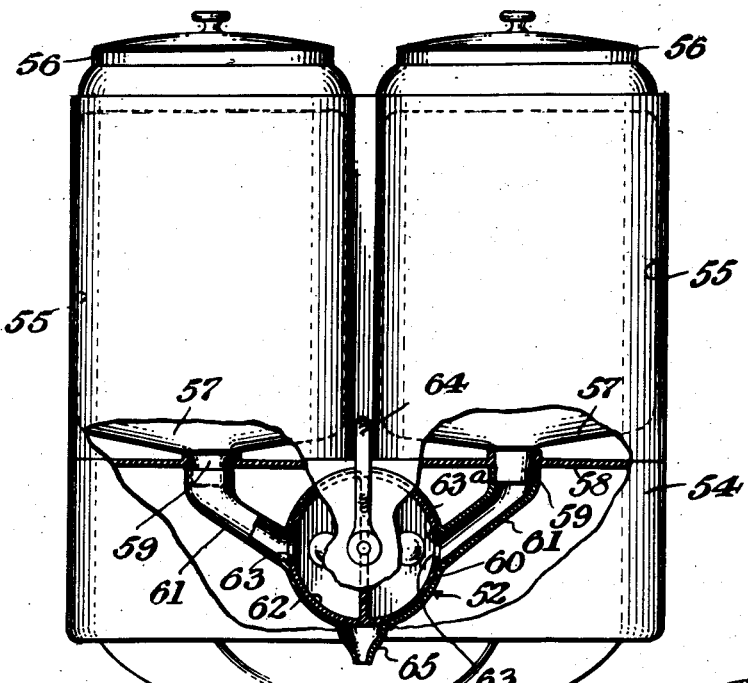
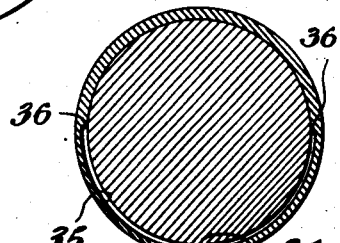
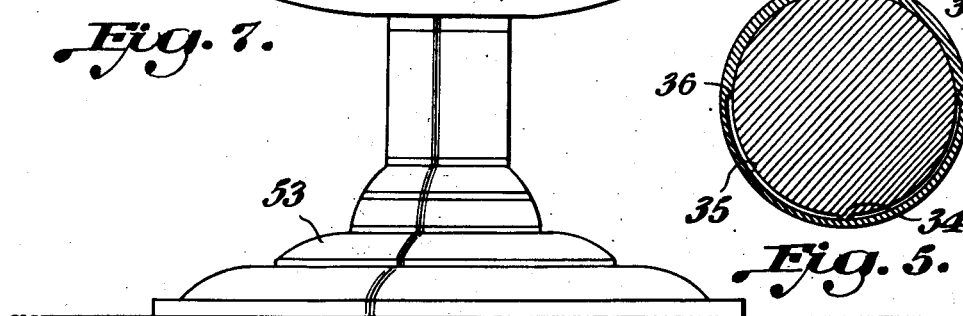
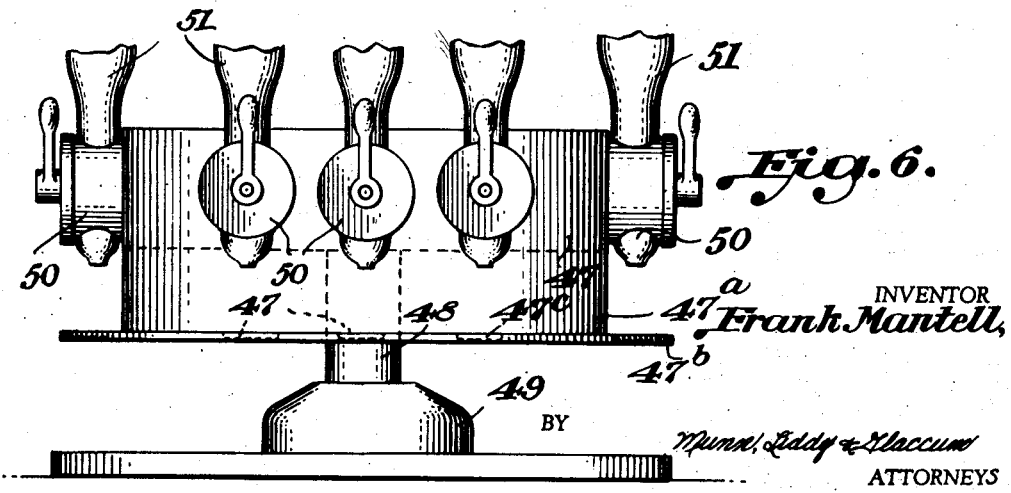
INVENTOR  
*Frank Mantell*  
BY  
*Munn, Liddy & Glaccum*  
ATTORNEYS Patented May 19, 1953

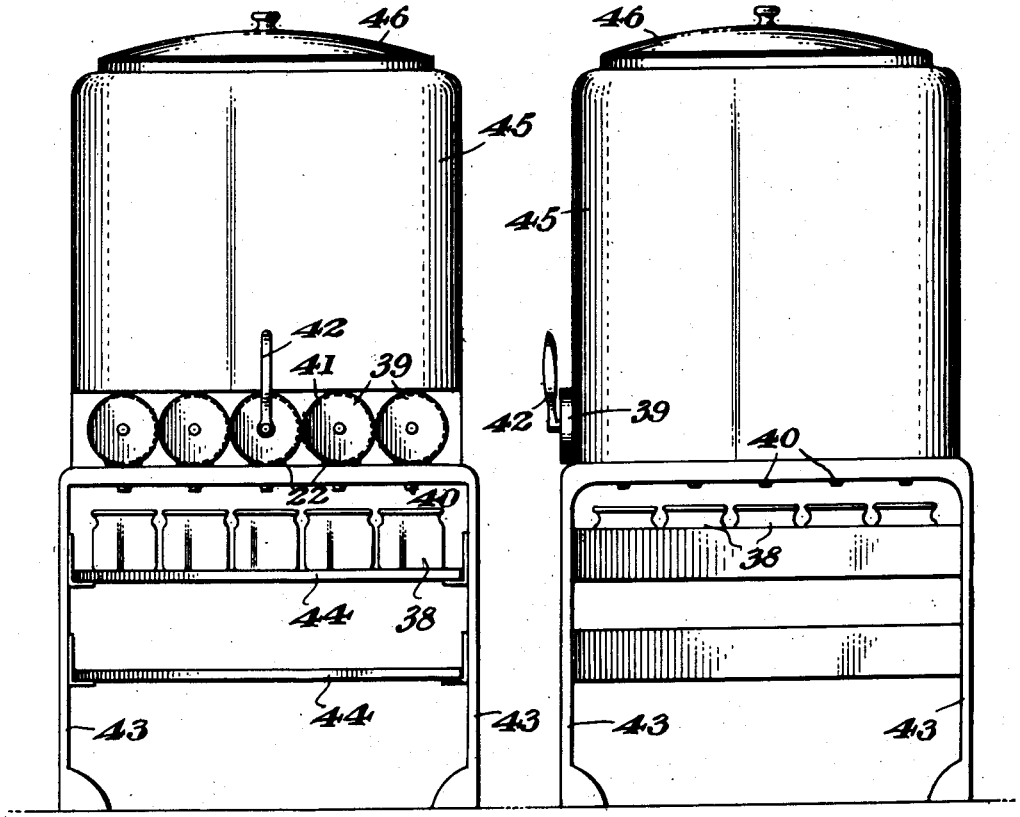
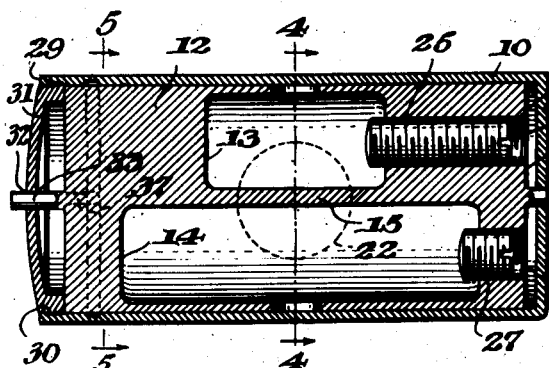
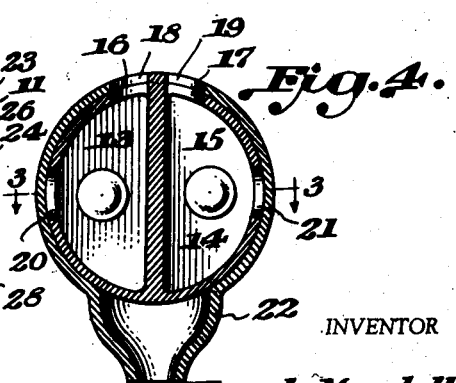

2,639,060

UNITED STATES PATENT OFFICE 2,639,060

DISPENSING APPARATUS FOR MEASURING AND DELIVERING A PLURALITY OF LIQUIDS

Frank Mantell, Detroit, Mich.

Application April 17, 1951, Serial No. 221,505

7 Claims. (Cl. 222—138)

This invention relates to dispensing apparatus, and more particularly to an improved device for discharging a predetermined quantity of liquid with consistency.

An object of the invention is the provision of a novel valve divided into a plurality of liquid retaining chambers each adapted to hold a desired quantity of liquid whereby rotation of the valve in a given direction will discharge the liquid automatically controlling the amount thereof.

Another object of my invention is to provide means for pre-setting the capacity of each liquid retaining chamber.

One advantage of the device lies in the adaptability of the valve structure for use with a multiple discharge machine where a large number of awaiting containers may be simultaneously supplied with an equal quantity of liquid. Furthermore, this valve may be used in connection with more than one liquid at a time, each different type of liquid being communicated to an associated retaining chamber within the valve.

These and other objects and advantages will become apparent from the following description of the present invention illustrated in the accompanying drawing, in which:

Figure 1 is a front elevation view of one form of the invention.

Figure 2 is a side elevation view of the apparatus shown in Figure 1.

Figure 3 is a sectional view of the device taken on line 3—3 of Fig. 4.

Figure 4 is a sectional view taken on line 4—4 of Fig. 3.

Figure 5 is a sectional view taken on line 5—5 of Fig. 3.

Figure 6 is a fragmentary elevation view of a device embodying the present invention.

Figure 7 is an end elevation view of another device with which the invention may be used with parts thereof broken away in order to disclose the interior of the device.

Similar reference characters represent similar parts in the several figures.

The basic element of this invention consists of a novelly constructed valve unit. This valve unit in the form of the invention illustrated contains two voids or cavities segregated from each other so that the contents of each may be dispensed separately in accordance with either the type or quantity of the substance desired. The particular form of valve is shown in Fig. 3. A hollow cylindrical sleeve 10 having an end wall 11 formed on one end thereof contains a complementary cylindrical valve body 12. This valve body is preferably formed of from one-and-a-quarter to two inch cylindrical stock. The outer periphery of valve body 12 is telescopically received by the inner periphery of the sleeve with a sufficient complementary fit to permit free relative rotation of the two members, and at the same time prevent fluid-leakage therebetween.

Within the valve body there are formed two fluid receiving compartments 13 and 14. These compartments are separated one from the other by an intermediate partition 15 extending longitudinally of the valve body and normally resting in a vertical position when the valve is closed, as shown in Figure 4.

It will be noted from Figure 3 of the drawing that compartments 13 and 14 are of different sizes and the capacity of each represents a predetermined volume of fluid to be dispensed. For instance, there are various circumstances when either one of two quantities of fluid would be desired, depending upon the recipe used. In other words, it would be convenient to make chamber 13 of sufficient size to insure exactly one ounce of fluid substance to be discharged, and at the same time construct chamber 14 with a two ounce capacity. Of course these relative amounts are merely by way of illustration and any particular quantity could be used. For instance, chamber 13 could normally hold the quantity of cream, milk, liquor, etc. customarily used by the average person. At the same time with chamber 14 having a double capacity it is obvious that by dispensing the fluid confined in chamber 14 the increased quantity could be supplied with a single operation of the valve.

Referring to Fig. 4 it will be seen that the two chambers 13 and 14 are provided with inlet openings 16 and 17 respectively. In the normally closed position of the valve these openings communicate with alined apertures 18 and 19 located in the top portion of the surrounding sleeve. It will of course be realized that instead of the independent apertures 18 and 19 a single opening large enough to cover both inlets 16 and 17 can be provided.

The sleeve inlet opening in turn communicates with a supply of liquid or other fluid substance so that in the position of the valve shown in Fig. 4 the substance to be handled flows freely into each of the retaining compartments. It will be further noted that the compartments are provided with discharge openings 20 and 21, respectively, which can be selectively brought into alinement with a dispensing spout 22 located in the bottom of sleeve 10. Assuming that a one ounce quantity for example, is desired in the awaiting retainer, rotation of the valve body in a counter-clockwise direction will accordingly bring discharge opening 20 into alinement with the dispensing nozzle and the contents of chamber 13 will accordingly be emptied into an awaiting container. On the other hand, if the particular amount desired is equal to the capacity of chamber 14, rotation of the valve body in a clockwise direction will aline discharge outlet 21 with the dispensing nozzle, and that particular quantity will be emptied into the awaiting nozzle.

As best seen in Fig. 3, I have provided an adjustable means which permits a graduated control of the capacity of each compartment. A horizontal aperture 23 is formed in the stock of the valve body connecting the interior of chamber 13 with the end face 24 of the valve body. Aperture 23 is provided with appropriate threads whereby an externally threaded plug or insert 25 may be screwed into the aperture, as shown in the drawing.

A conventional transverse slot 26 is located in the outer end of plug 25, permitting the manipulation of the plug with the ordinary screw driver. Thus it will be seen that by threading plug 25 into chamber 13, a certain amount of the void is thereby filled by the plug, making the volumetric capacity decrease accordingly. Manipulation of the plug into and out of the chamber therefore permits a micro-control of the amount of fluid dispensed with each operation of the valve. Naturally, a similar plug 27 is located in a second horizontal aperture 28 cominicating with the larger chamber 14. Control of the volumetric capacity of chamber 14 is likewise possible with proper manipulation of plug 27. It is pointed out that plug 27, as shown in Fig. 3, can be replaced with a much longer insert, if the quantity of substance to be dispensed is such that a greater portion of the void would have to be filled than is possible with a short plug, shown in this figure. While it is anticipated that the particular use selected for the valve will be more or less consistent, it is, nevertheless, an important feature of the invention that substitution of the various length plugs permit exceptional versatility in the device.

Referring once again to Fig. 3, it is pointed out that sleeve 10 has one end 29 which is initially open. This permits insertion of the valve body 12 into the sleeve, thus affording a means for quick assembly and disassembly for purposes of repair, cleaning, etc. Open end 29 is provided with internal threads as shown at 30. These threads are adapted to cooperate with external threads formed about the periphery of an end closure or plug 31. Plug 31 is provided with a central aperture 32 permitting the operating stem 33 to extend therethrough. Stem 33 is of course integral and coaxial with the valve body and has connected to its outer end an appropriate handle (not shown) to permit rotation of the valve body within the sleeve.

A stop means is incorporated within the structure in order to insure a 90° rotation of the valve in either direction from the position shown in Fig. 4. This permits the operator to turn the handle throughout the limit of its movement either clockwise or counter-clockwise, and the abutments of the stop means will automatically limit the valve when a full open position has been reached. To accomplish this stop control I provide the valve body with a small projection or stud 34. This stud normally rides in a complementary groove 35 formed on the inner surface of sleeve 10 and extends approximately 180° around the inner periphery of this sleeve. The position of the stud as shown in Fig. 5, is assumed when the valve handle is in the off-position and the valve body and sleeve are resting as shown in Fig. 4. When the valve is turned in either direction through an arc of 90° the appropriate compartment is brought into alinement with the dispensing nozzle and the abutment 36 engages lug 34 to prevent further rotation of the valve body within the sleeve.

A longitudinal groove 37 may be provided extending from end 29 to the peripheral groove 35 in order that the lug 34 may be provided with sufficient passageway to permit insertion of the valve body. On the other hand, if desired, the lug and complementary groove can be located directly adjacent the internal threads 30 and, with this construction, passageway 37 will be unnecessary.

The basic principle involved in my novel valve structure can be adapted to a number of dispensing machines used for various needs. For example, Figures 1 and 2 show a multiple dispensing apparatus in which twenty-five different containers 38 can be filled simultaneously with an identical quantity of fluid. In this particular apparatus I have shown a bank of five cylindrical valves 39 in horizontal juxtaposition. Each valve 39 is basically the same as that shown in Fig. 3 with the exception that five discharge outlets are provided for each individual chamber contained therein. Thus, when the cylindrical valve body is rotated in one direction the filled chamber will discharge through five different dispensing nozzles 40 into the awaiting containers. The fluid containing compartments within the valve body may each be one elongated cavity, or if preferred, each major compartment can be divided transversely to form five equal sub-compartments extending end to end longitudinally of the cylindrical valve body. In order to insure simultaneous rotation of each valve insert 39 I provide peripheral gear teeth 41 so that when the operating handle 42 rotates the center valve, for instance in a clockwise direction, the two adjacent valves thereto will rotate in a counter-clockwise direction and the peripheral teeth on these two valves will simultaneously rotate the two outer valve inserts in a clockwise direction. Thus each valve insert will rotate simultaneously through an arc of 90° in accordance with the movement of the center valve. This modification of the invention may take any convenient form, and for the purposes of illustration I have shown a supporting frame 43 having a plurality of removable container racks 44, each of which will accommodate twenty-five containers moving said containers into correct position beneath a particular dispensing nozzle 40. Above this rack is located an appropriate fluid reservoir 45 having a removable top 46 in order that fluid contents may be replenished when desired.

It will of course be understood that the particular number of discharge spouts or the particular number of valve inserts 39 are merely a matter of choice. A single valve insert having any number of dispensing spouts could of course be used and also the particular number of juxtaposed valve inserts could be increased or decreased in accordance with the requirements of the situation.

A convenient embodiment of the valve shown in Fig. 3 may take the form of the dispensing apparatus illustrated in Figure 6 of the drawings. To this form of the invention a rotating head 47 is pivotally supported on a central shaft 48 having an appropriate pedestal 49. Head 47 may be rectangular or circular in plan as desired and has spaced about the perimeter thereof a plurality of individual valve units 50. Each valve unit is similar in construction to the valve shown in Fig. 3 and is further provided with a bottle supporting recess in the upper portion thereof. This recess permits the retention of an inverted bottle or other container 51 so that a continuous supply of fluid is available to each valve unit at all times. The intended purpose of this apparatus is to provide a means for dispensing a plurality of different types of fluid whereby the rotatable head 47 can bring the dispensing unit in vertical alinement with the receiving end of an appropriate container. A very convenient counter-dispenser is thus provided.

A skirt 47a may be provided if desired and preferably has a horizontal flange 47b extending outwardly from the axis of the apparatus. The flange contains recesses 47c beneath each dispensing valve in order to hold small receiving glasses to be filled.

Still another form of the invention is shown in Fig. 7 of the drawings. The object of the illustrated apparatus is to selectively dispense one or the other of two different types of fluid. For example, orange juice and tomato juice. The valve units 52 are basically similar to the construction shown in Fig. 3. However, the fluid retaining compartments may or may not be of different capacity, depending upon the quantity of the fluid normally dispensed to the consumer. In this form of the invention an appropriate stand or pedestal 53 supports an upper housing 54 having vertical compartments 55 therein covered by appropriate lids 56. These compartments may be constructed to actually receive the intended fluid or may, as shown in the drawing, merely be a retainer for the usual jug or bottle 57 in which the fluid is distributed commercially. A horizontal partition 58 extending through each compartment of the housing has a central aperture adapted to receive the neck 59 of the bottle. This aperture communicates with the interior of valve sleeve 60 by means of inclined tubes 61. The valve sleeve is rigidly secured in place and has an appropriate inlet opening on each side thereof for admission of the fluid to be dispensed.

The cylindrical valve body 62 is provided with oppositely disposed inlet openings 63. These openings permit the fluid contained in each bottle to enter the appropriate retaining compartment within the valve. In the normally closed position of the valve as shown in Fig. 7 the proper amount of fluid will fill each compartment and subsequently when the operating handle 64 is turned 90° one or the other compartments will discharge its contents through the dispensing nozzle 65. For purposes of illustration let us assume that the bottle on the right side of the apparatus contains orange juice and the bottle on the left side of the apparatus contains tomato juice. When the attendant rotates operating handle 64 in a clockwise direction, the discharge opening 63a will be rotated to an alined position with the dispensing nozzle. On the other hand, should tomato juice be desired appropriate rotation of the handle in a counterclockwise direction will aline discharge opening 63 with the dispensing nozzle and the contents of the associated compartment will be emptied into an awaiting container.

From the foregoing description of the present invention it will be seen that I have provided an efficient valve structure which will permit the dispensing of a selected quantity or type of fluid automatically upon simple rotation of the operating handle through a 90° arc. This device completely eliminates the time and inaccuracies involved in the conventional dispensing mechanism. Not only is there an appreciable saving in both material and labor in the operation of the present invention, but the assurance of an exact addition to a mixture or recipe is an important factor. The amount of substance dispensed may be controlled with extreme accuracy due to the adjustability of the threaded insert located within the valve body.

While I have shown and described a preferred form of my invention, it will be understood that variations in details of form may be made without departure from the invention as defined in the appended claims.

I claim:

1. A device for selectively dispensing fluids comprising a hollow cylindrical valve body, a partition within said body dividing the interior thereof into two chambers, said body containing separate means for admitting and discharging fluid to and from each chamber, a cylindrical sleeve surrounding the periphery of said valve body, said sleeve having an inlet opening alined with each of said fluid admitting means at a predetermined position of the valve and having a dispensing opening selectively alined with one of said discharge means upon rotation of the valve body in one direction and with the other of said discharge means upon rotation in the opposite direction, and means for rotating said valve body within the sleeve.

2. The device as set forth in claim 1 in which one end of said sleeve is open to permit insertion of the valve body, said open end having internal threads thereon, an axial operating stem on the valve body extending through said open end, an externally threaded plug adapted to be received by said open end to retain the valve body in the sleeve, said plug having a central aperture therein to permit said stem to extend therethrough.

3. A device for selectively dispensing fluids comprising a hollow cylindrical valve body, a partition within said body dividing the interior thereof into two chambers, said body containing separate means for admitting and discharging fluid to and from each chamber, a cylindrical sleeve surrounding the periphery of said valve body, said sleeve having an inlet opening alined with each of said fluid admitting means at a predetermined position of the valve, and having a dispensing opening selectively alined with one of said discharge means upon rotation of the valve body in one direction and with the other of said discharge means upon rotation in the opposite direction, means for rotating said valve body within the sleeve, and means for adjusting the capacity of each of said chambers.

4. A dispensing device comprising a hollow cylindrical valve body, a partition within said body dividing the interior thereof into two chambers, said body containing means for admitting and discharging fluid to and from each chamber, a cylindrical sleeve surrounding the periphery of said valve body, said sleeve having an inlet opening alined with each of said fluid admitting means at a predetermined position of the valve and having a dispensing opening selectively alined with one of said discharge means upon rotation of the valve body in one direction and with the other of said discharge means upon rotation in the opposite direction, means for rotating said valve body within the sleeve, said cylindrical valve body having a threaded aperture connecting each of said chambers to the exterior of the body, an elongated threaded insert in each of said apertures adapted to be extended into its associated chamber a predetermined distance to regulate the capacity of the chamber.

5. A dispensing device comprising a cylindrical valve body having two segregated fluid retaining chambers, one of said chambers being of greater capacity than the other, a cylindrical sleeve surrounding the periphery of said body and having an inlet opening in the upper portion thereof and a dispensing outlet in the lower portion thereof, said valve body having an inlet opening connecting each chamber with the exterior of the body, said inlet openings in the body being normally alined with the sleeve inlet opening, said body having oppositely disposed discharge openings selectively connecting each chamber with said dispensing outlet upon predetermined rotation of the valve body with respect to the sleeve and means for rotating the valve body.

6. A dispensing device comprising a cylindrical valve body having two segregated fluid retaining chambers, one of said chambers being of greater capacity than the other, a cylindrical sleeve surrounding the periphery of said body and having an inlet opening in the upper portion thereof and a dispensing outlet in the lower portion thereof, said valve body having an inlet opening connecting each chamber with the exterior of the body, said inlet openings in the body being normally alined with the sleeve inlet opening, said body having oppositely disposed discharge openings selectively connecting each chamber with said dispensing outlet upon predetermined rotation of the valve body with respect to the sleeve, means for rotating the valve body, and means for adjusting the capacity of each of said chambers.

7. A dispensing device comprising a cylindrical valve body having two segregated fluid retaining chambers, one of said chambers being of greater capacity than the other, a cylindrical sleeve surrounding the periphery of said body and having an inlet opening in the upper portion thereof and a dispensing outlet in the lower portion thereof, said valve body having an inlet opening connecting each chamber with the exterior of the body, said inlet openings in the body being normally alined with the sleeve inlet opening, said body having oppositely disposed discharge openings selectively connecting each chamber with said dispensing outlet upon predetermined rotation of the valve body with respect to the sleeve, means for rotating the valve body, said cylindrical valve body having a threaded aperture connecting each of said chambers to the exterior of the body, an elongated threaded insert in each of said apertures adapted to be extended into its associated chamber a predetermined distance to regulate the capacity of the chamber.

FRANK MANTELL.

References Cited in the file of this patent

UNITED STATES PATENTS

| Number | Name | Date |
|---|---|---|
| 1,767,928 | Jellison | June 24, 1930 |
| 1,814,483 | Morgan | July 14, 1931 |
| 2,046,220 | Tanner | June 30, 1936 |